(12) United States Patent
Bright

(10) Patent No.: US 6,223,494 B1
(45) Date of Patent: May 1, 2001

(54) STRUCTURAL CONNECTOR

(76) Inventor: Gary L. Bright, 47427 Brent Ct., New Baltimore, MI (US) 48047

( * ) Notice: Subject to any disclaimer, the term of this patent is extended or adjusted under 35 U.S.C. 154(b) by 0 days.

(21) Appl. No.: 09/041,235

(22) Filed: Mar. 12, 1998

(51) Int. Cl.[7] .............................. E04H 12/10; F16B 7/18
(52) U.S. Cl. ....................... 52/653.1; 52/731.7; 403/337; 403/217; 248/219.1
(58) Field of Search ................................ 403/363, 337, 403/335, 217, 218, 219, 170, 174, 178; 52/731.8, 731.9, 731.7, 736.1, 633, 638, 648.1, 653.1; 256/DIG. 5; 40/607; 248/219.1, 219.2, 219.4, 218.4

(56) References Cited

U.S. PATENT DOCUMENTS

| | | | |
|---|---|---|---|
| 1,092,503 | * | 4/1914 | Moore ................................. 403/174 |
| 1,238,976 | * | 9/1917 | Zika ....................................... 40/607 |
| 1,915,023 | * | 6/1933 | Lizaso et al. ........................ 52/648.1 |
| 1,918,570 | * | 7/1933 | Sheras ................................... 40/607 |
| 2,079,635 | * | 5/1937 | Sharp .............................. 52/731.7 X |
| 2,350,433 | * | 6/1944 | Vernon ................................... 40/607 |
| 2,675,895 | * | 4/1954 | Loewenstein ................... 52/653.1 X |
| 2,899,764 | * | 8/1959 | Oberlin, Jr. ......................... 40/607 X |
| 3,475,044 | * | 10/1969 | Konstant .............................. 403/217 |
| 3,564,783 | * | 2/1971 | Dunne ........................... 248/219.1 X |
| 3,688,461 | * | 9/1972 | Rensch ................................ 52/653.1 |
| 3,704,001 | * | 11/1972 | Sloop ................................. 248/219.4 |
| 4,544,300 | * | 10/1985 | Lew et al. ........................... 403/170 |
| 4,577,449 | * | 3/1986 | Celli .............................. 248/218.4 X |
| 5,930,972 | * | 8/1999 | Benner et al. ..................... 52/653.1 |

* cited by examiner

*Primary Examiner*—Harry C. Kim
(74) *Attorney, Agent, or Firm*—Brooks & Kushman P.C.

(57) ABSTRACT

A structural connector for use with a signpost, the structural connector comprising a body connectable to the signpost and at least one primary flange extending from the body.

4 Claims, 4 Drawing Sheets

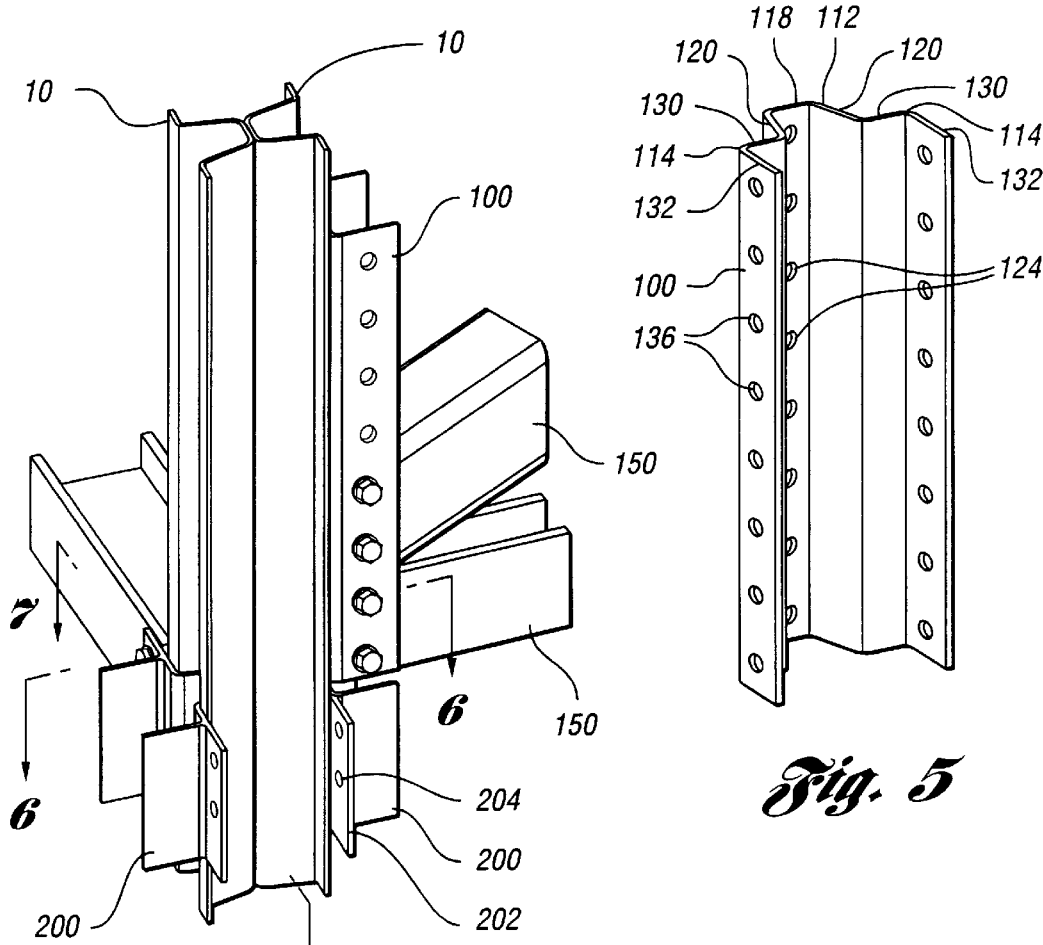
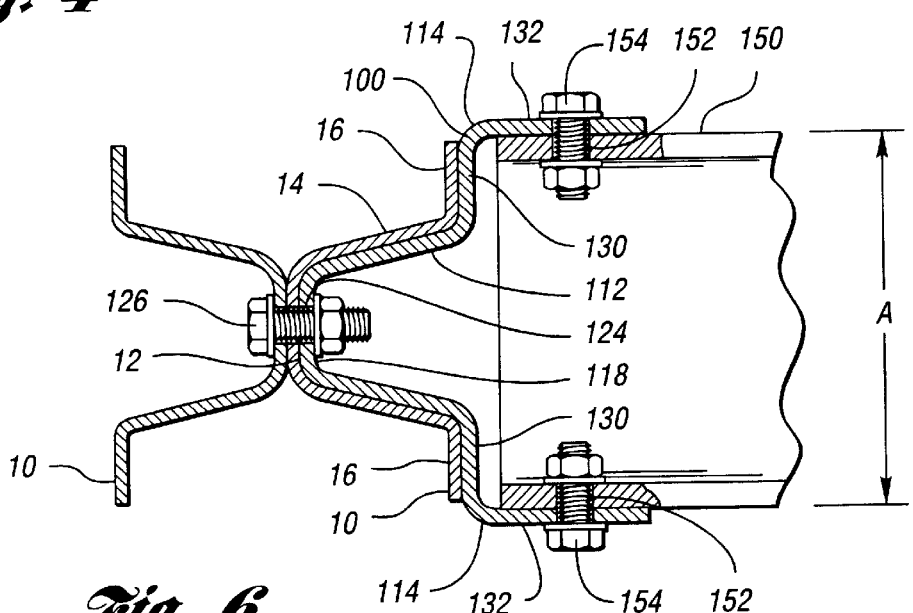

STRUCTURAL CONNECTOR

TECHNICAL FIELD

The present invention relates to an improved structural connector for use with a signpost.

BACKGROUND ART

Conventional signposts used to support various roadway signs such as those directing a motorist to "stop," "yield," etc., typically have a configuration similar to that shown in FIGS. 1 and 2. More specifically, and as shown in FIG. 2, such signposts 10 in cross-section typically have a flat back section 12, two side sections 14 extending from the back section 12, and two flanges 16 extending from the side sections 14. The face of the two flanges 16, or in the case of a signpost lacking such flanges the face defined by outermost end of the two side sections 14 will be referred to as the front signpost face, designated 18 on FIG. 2. The direction perpendicular to the front signpost face 18, designated "X" on FIG. 2, will be referred to as the X direction. The direction parallel to the front signpost face 18, designated "Y" on FIG. 2, will be referred to as the Y direction.

Additionally, the back section 12 typically includes signpost bores 20 which are spaced regularly along the length of the side post 10. The bores 20 are used to attach a sign 50 to the signpost 10. As shown in FIGS. 1 and 2, the sign 50 typically has one or more signpost bores 52. Such a sign 50 is typically laid flat against the flanges 16 of the signpost 10 and then attached to the signpost 10 by running a connection assembly 54, such as a nut and bolt or any other suitable connection assembly, through both the sign bore 52 and a signpost bore 20.

In order to support signs, conventional signposts are typically driven into the ground or set within a concrete foundation.

Beyond being used for supporting signs, such signposts 10 do not typically have other uses.

SUMMARY OF THE INVENTION

An object of the present invention is to provide a new and improved structural connector such that conventional signposts may be used for other purposes, such as to construct structures.

In carrying out the above objects, and other objects and features of the present invention, a new and improved structural connector for use with a signpost is provided. The structural connector comprises a body connectable to the signpost and at least one primary flange extending from the body.

In a more preferred embodiment, the body has a nesting configuration such that the body nests with the signpost. This nesting configuration may have a back section, and at least one side section extending from the back section, the at least one primary flange extending from the side section.

The primary flange may include a connector flange portion and in a preferred embodiment the primary flange includes a conforming flange portion and a connector flange portion.

In a more specific embodiment, a new and improved structural connector is provided for use with a signpost having a signpost back section and signpost side walls. The structural connector comprises a body connectable to the signpost. The body has a body back section and at least one body side section oriented to the body back section such that the body approximately conforms to and nests within the signpost back section and a signpost side section. Such a structural connector would also include at least one primary flange extending from the at least one body side section.

In yet another more specific embodiment, the structural connector comprises a body connectable to the signpost, the body having a body back section and two body side sections oriented to the body back section such that the body approximately conforms to and nests within the signpost back section and the signpost side sections. Like the previously described embodiment, this structural connector would also include a primary flange extending from at least one of the two body side sections, the primary flange having a connector flange portion.

In each of these embodiments, the structural connector may include at least one secondary flange. This secondary flange may extend from the at least one primary flange. This secondary flange may be oriented approximately parallel to the back section of the body and may have at least one secondary flange bore.

Additionally, in each of these embodiments, the back section may have a back section bore for connecting the structural connector to the signpost. Furthermore, in each of these embodiments, the primary flange may have a primary flange bore for connecting structural components to the primary flange.

The advantages accruing to the present invention are numerous. For example, this invention allows signposts to be interconnected with other structural numbers such that signposts may be utilized to construct structures. Because of the simplicity of this invention, the number of different constructional components needed to construct a structure have been minimized.

If the structural connector includes both a primary and secondary flange, structural members may be connected to signposts along either the X or Y directions, allowing an infinite number of structures to be constructed. Furthermore, in the event such primary or secondary flanges are set at angles other than along the X or Y axes, an infinite number of alternative structures may be constructed.

Another advantage of the present invention is the nesting configuration of the body of the structural connector. This allows the structural connector to be connected to a signpost with a single connector assembly, such as a bolt and nut, such that the structural connector will not be able to rotate about the axis of the bolt and nut or other suitable connector assembly.

These objects, features, and advantages, and other objects, features, and advantages of the present invention, will be readily appreciated by one of ordinary skill in the art from the following detailed description. Note that while embodiments of this invention are illustrated and disclosed, these embodiments should not be construed to limit the claims. It is anticipated that various modifications and alternative designs may be made without departing from the scope of this invention.

BRIEF DESCRIPTION OF THE DRAWINGS

FIG. 4 is a blow-up of that portion of FIG. 3 within the encircled portion labeled 4;

FIG. 5 is a perspective view of one embodiment of the structural connector of the present invention;

FIG. 6 is a cross-sectional view taken along line 6—6 of FIG. 4, showing one embodiment of the structural connector of the present invention;

BEST MODES FOR CARRYING OUT THE INVENTION

Figure 1:
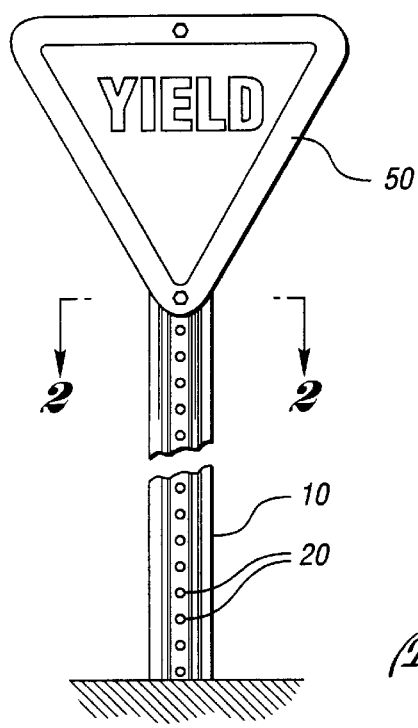
FIG. 1 is a perspective view of a typical prior art signpost with a sign attached.
Figure 2:
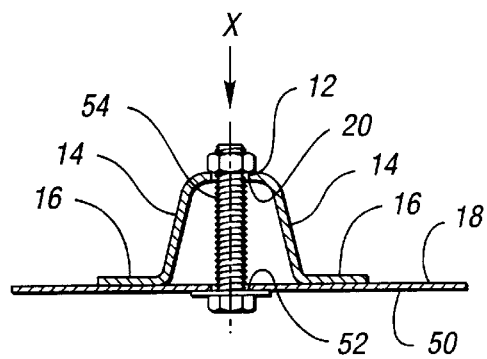
FIG 2 is a cross-sectional view taken along line 2—2 of FIG. 1.
Figure 3:
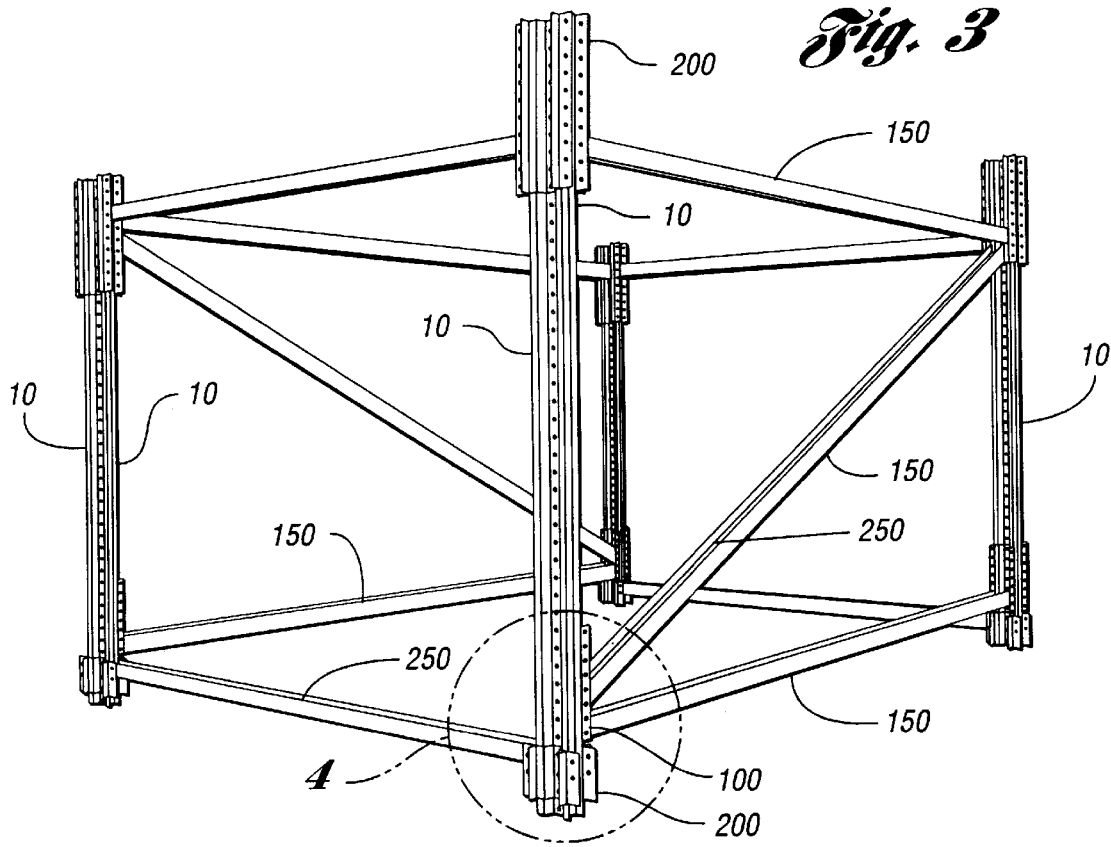
FIG. 3 is a perspective view of a simple structure built using the structural connector of the present invention.

FIG. 3 shows a relatively simple structure constructed using signposts 10 and structural members, 150 and 250, together with different embodiments of the structural connectors, 100 and 200, of the present invention. While single signposts could be used as the column members in constructing a structure, two signposts have been utilized back-to-back, as shown in FIGS. 4 and 6, to construct the columns used in the structure shown in FIG. 3.

One embodiment of the present invention of the structural connector 100 is shown in more detail in FIGS. 4, 5, and 6. More specifically, structural connector 100 includes a body 112 and two primary flanges 114 extending from the body 112. In this embodiment, as shown in FIGS. 5 and 6, the body 112 of the structural connector 100 has a nesting configuration such that the body 112 nests with the signpost 10. More specifically, in this embodiment, the body 112 nests within the space formed by the signpost back section 12 and the signpost side sections 14.

The nesting configuration of this embodiment has a body back section 118 and two body side sections 120. The primary flanges 114 extend from the body side sections 120. As can be seen in FIG. 6, the body side sections 120 are oriented at an angle to the body back section 118—typically but not necessarily a non-perpendicular angle—such that the body back section 118, together with the body side sections 120 will approximately conform to and nest within the signpost back section 12 and the signpost side sections 14.

The body back section 118 has at least one back section bore 124 such that the structural connector 100 may be connected to a signpost 10 via a connector assembly 126 which may be a bolt and nut assembly or any other suitable connection assembly. However, whether or not the structural connector 100 has a connector back section bore 124, the structural connector 100 could alternatively be connected to a signpost 10 by welding or by any other suitable method.

In the event a connector back section bore 124 is utilized, the back section 118 may have any number of back section bores 124. In a preferable embodiment, the back section 118 would have back section bores 124 of a similar dimension and spaced similarly to the signpost bores 20 running along the signpost back section 12.

As shown in FIGS. 5 and 6, the primary flange 114 of this embodiment includes a conforming flange portion 130 and a connector flange portion 132. As shown in this embodiment, the conforming flange portion 130 conforms with the signpost flanges 16. The connector flange portions 132, on the other hand, are oriented approximately perpendicular to the body back section 118 of the connector 100 and form a space between them designated "A." In this embodiment, the connector flange portions 132 have primary flange bores 136.

As can be seen in FIG. 6, the connector flange portions 132 of connector 100 are spaced at a distance "A" such that a structural member 150, such as a conventional I-beam, will fit within the space "A" formed by the connector flange portions 132. As shown in FIGS. 4 and 6, such structural members 150 having member bores 152 may then be connected to the connector 100 via a connector assembly 154, such as a nut and bolt, or any other suitable connection assembly, which may be inserted through the primary flange bores 136 and the structural member bores 152 so as to connect the structural member 150 to the connector 100.

However, the connector flange portion 132 need not have primary flange bores 136. Instead, any other suitable connection method could be employed, such as by welding a structural member to the connector flange portion.

Figure 7:
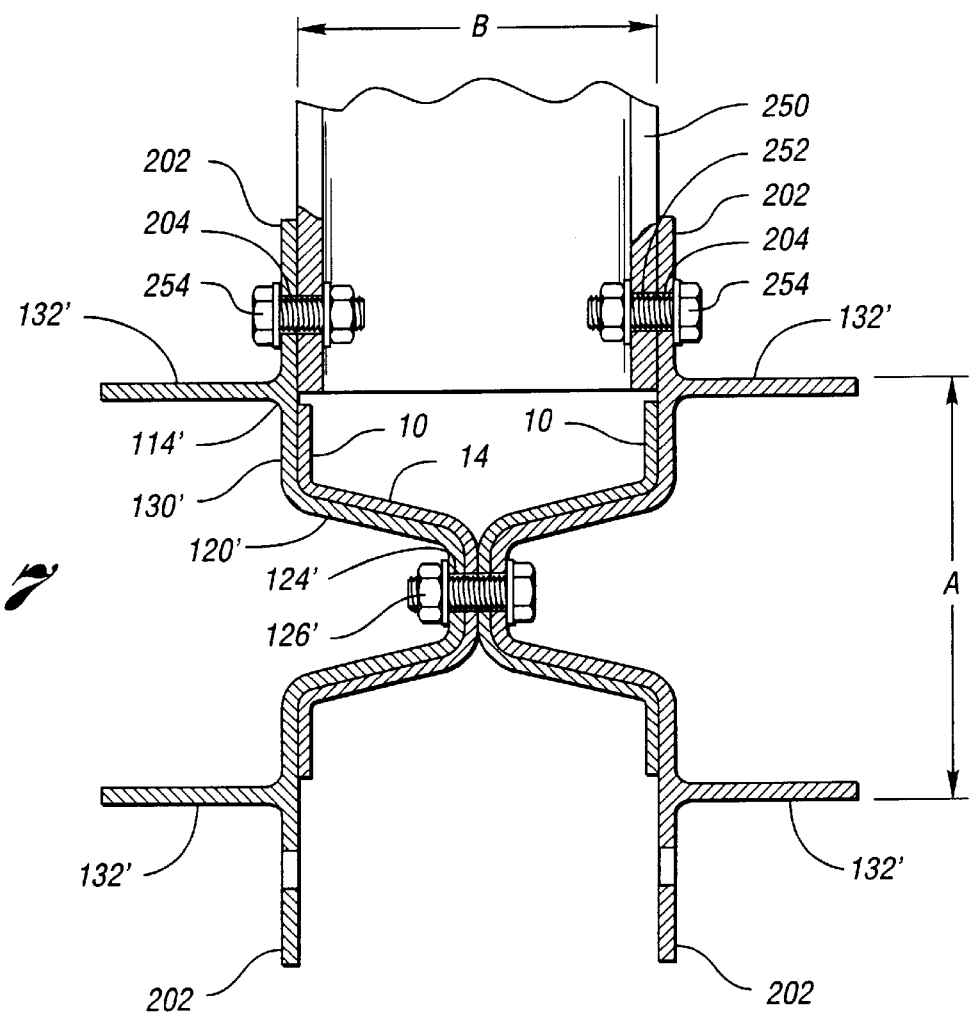
FIG. 7 is a cross-sectional view taken along the line 7—7 of FIG. 4, showing an alternative structural connector of the present invention.

An alternative structural connector 200 of this invention is shown in FIGS. 4 and 7. As can be seen, connector 200 is similar to connector 100 except that connector 200 includes secondary flanges 202 extending from the primary flanges 114'. Because of the similarities, the reference characters of connector 100 are primed to indicate similar structures. In this embodiment, the secondary flanges 202 include secondary flange bores 204 such that structural members 250 having structural member bores 252 may be connected via a connector assembly 254, such as a nut and bolt or by any other suitable connection assembly. Like connector 100, the connector 200 need not include structural member bores 252. Instead, structural members could be attached to the secondary flange in any suitable manner, such as by welding.

As shown in FIG. 7, it is preferable that the secondary flanges 202 be oriented and located such that when connectors 200 are nested back-to-back within a double signpost column, the dimension "B" between the two secondary flanges 202 will equal the dimension "A" between the connector flange portions 132'. This enables a similar or identical structural member, in this embodiment, the structural members 150 and 250, to be used along either the direction relative to the double signpost.

Figure 8:
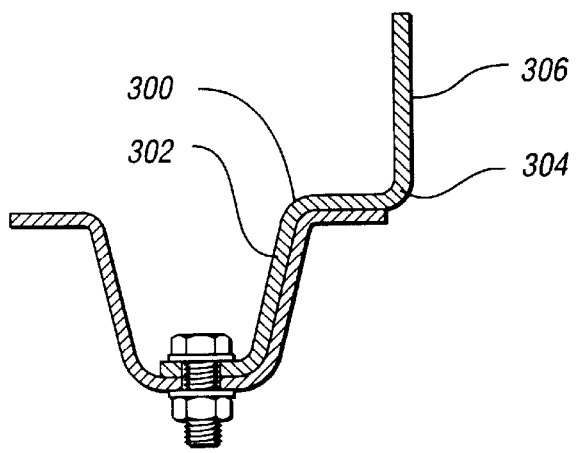
FIG. 8 is a cross-sectional view showing another alternative structural connector of the present invention.

FIG. 8 illustrates another alternative structural connector 300 which is similar to the structural connector 100 as shown in FIGS. 4, 5, and 6 with the exception that this structural connector 300 has only one side section 302 and only one primary flange 304 having a connector flange portion 306.

Figure 9:
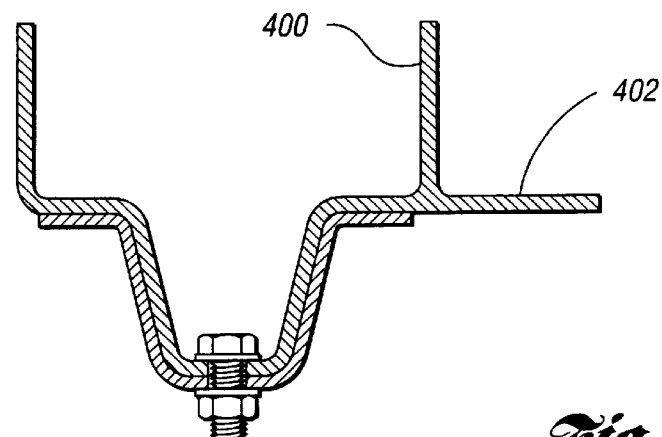
FIG. 9 is a cross-sectional view showing another alternative structural connector of the present invention.

FIG. 9 shows another alternative connector 400, which is similar to the connector 200 shown in FIG. 7 except that structural connector 400 has only one secondary flange 402.

Figure 10:
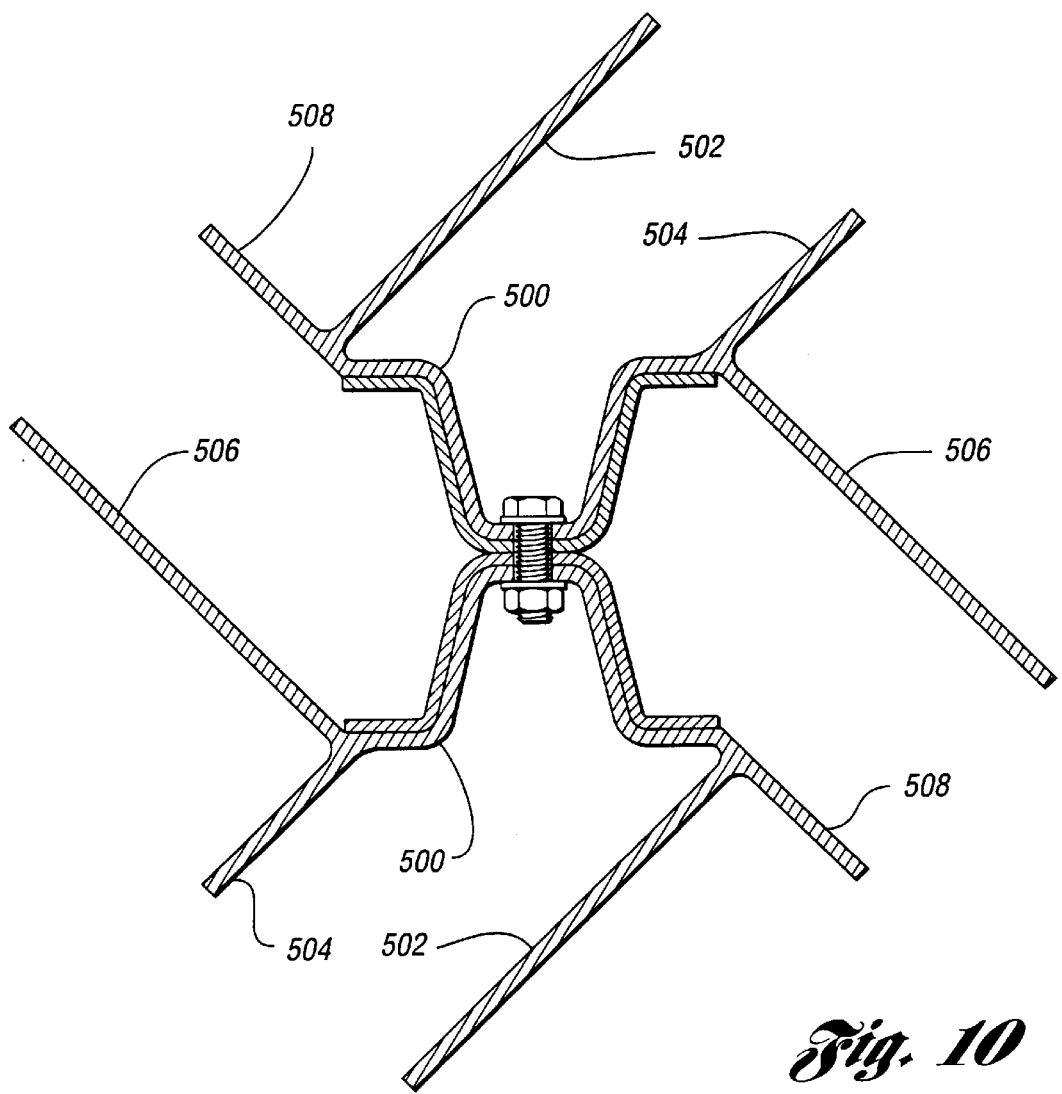
FIG. 10 is a cross-sectional view showing another alternative structural connector of the present invention.

FIG. 10 shows yet another alternative connector 500 which is similar to the connector 100 shown in FIGS. 4, 5, and 6, except that the connector flange portions 502 and 504 and the secondary flanges 506 and 508 extend from the connector 500 at an angle—in this embodiment approximately 45°—to the X and Y directions. Structural members could then, of course, be connected to the connector at a 45° angle. It can be appreciated that such connectors can be manufactured with the flanges set in any desired direction and with bores at any desired location.

While not shown, the structural members could alternatively be connected to the flanges and connector at any desired angle by simply using a bent connection plate between the flanges and the structural member.

This invention allows a user to construct a variety of structures, including pole barns and other structures, in a simple and efficient manner using a minimum number of structural components. For example, the structure shown on FIG. 3 was built using only five different structural components, those being the signposts 10, the connectors 100, the connectors 200, the structural members 150 and 250 (which in this embodiment are identical), and connector assemblies 126, 154 and 254 (which in this embodiment are identical). In fact, as can be seen in FIG. 4, if the connectors 200 were extended so as to replace connectors 100, a similar structure could be built using only four different components.

Furthermore, if the structure shown in FIG. 3 were to be considered one bay, the same components could be connected to the structure shown in FIG. 3 so as to construct any number of additional bays in any desired direction.

In constructing such structures, the signposts may be set back-to-back so as to form double signpost columns as seen in the embodiment shown FIGS. 3, 4, 6, and 7. This will lend greater stability to the resulting structure. However, this is not required. Single signposts could be utilized.

In constructing a structure, such single or double signposts may be simply driven into the ground to any depth required or desired to maintain their stability. In the alternative, each signpost could be set within a suitable foundation, such as that formed by concrete.

In addition to the minimal number of components required, another advantage of this invention is the nesting configuration of the structural connector body. This allows a structural connector to be connected to a signpost with a single connector assembly such that the structural connector will not be able to rotate above the axis of the connector assembly.

Another advantage is that the structural connectors of the present invention may be cheaply manufactured. For example, such structural connectors can be manufactured in any desired length by the manufacturing process of extrusion. For example, such structural connectors could be extruded from 6061-T6 aluminum. While not required, such connectors are preferably in 20' to 25' lengths before being sawcut to required lengths.

While embodiments of the invention have been illustrated and described, it is not intended that such disclosure illustrate and describe all possible forms of the invention. It is intended that the following claims cover all modifications and alternative designs, and all equivalents, that fall within the spirit and scope of this invention.

What is claimed is:

1. A shelter structure having a frame comprising:
   a plurality of corner columns each formed from at least one street signpost having a signpost back section and signpost side sections;
   a plurality of structural members extending between respective pairs of the plurality of corner columns; and
   a structural connector for connecting each end of a structural member with a corner post, the structural connector comprising:
      a body connectable to the signpost, the body having a body back section and two body side sections oriented to the body back section so as to form a body shape and dimension that conforms to and nests within the signpost back section and one of the signpost side sections, wherein the body back section is connected to the signpost; and
      a primary flange extending from each opposed body side section to form a space allowing insertion of an end of one of the structural members.

2. The shelter structure of claim 1 wherein the connector further comprises at least one secondary flange extending from the at least one primary flange for connection to one of the structural members.

3. The shelter structure of claim 2 wherein the at least one secondary flange is oriented approximately parallel to the body back section.

4. A shelter structure having a frame comprising:
   a plurality of corner columns each formed from at least one street signpost having a signpost back section and signpost side sections;
   a plurality of I-beam structural members extending between respective pairs of the plurality of corner columns; and
   a structural connector for connecting each end of a structural member with a corner post, the structural connector comprising:
      a body connectable to the signpost, the body having a body back section and two body side sections oriented to the body back section so as to form a body shape and dimension that conforms to and nests within the signpost back section and one of the signpost side sections, wherein the body back section is connected to the signpost; and
      a primary flange extending from each opposed body side section to form a space allowing insertion of an end of one of the structural members.

* * * * *